US008339762B2

(12) United States Patent
North

(10) Patent No.: US 8,339,762 B2
(45) Date of Patent: Dec. 25, 2012

(54) CONTROL VALVE COIL TEMPERATURE CONTROLLER

(75) Inventor: Christopher North, Woodland Park, CO (US)

(73) Assignee: Sturman Industries, Inc., Woodland Park, CO (US)

( * ) Notice: Subject to any disclaimer, the term of this patent is extended or adjusted under 35 U.S.C. 154(b) by 340 days.

(21) Appl. No.: 12/686,925

(22) Filed: Jan. 13, 2010

(65) Prior Publication Data

US 2010/0176759 A1 Jul. 15, 2010

Related U.S. Application Data

(60) Provisional application No. 61/225,846, filed on Jul. 15, 2009, provisional application No. 61/144,997, filed on Jan. 15, 2009.

(51) Int. Cl.
*G05D 23/24* (2006.01)

(52) U.S. Cl. ........................................ 361/161; 318/473

(58) Field of Classification Search .................. 361/161; 318/473

See application file for complete search history.

(56) References Cited

U.S. PATENT DOCUMENTS

| | | | | |
|---|---|---|---|---|
| 4,366,678 | A * | 1/1983 | Yamazaki et al. | 62/186 |
| 5,152,266 | A * | 10/1992 | Sekiguchi et al. | 123/357 |
| 5,460,329 | A | 10/1995 | Sturman | |
| 6,731,450 | B1 * | 5/2004 | Codilian et al. | 360/69 |
| 7,600,492 | B2 * | 10/2009 | Bilek et al. | 123/52.1 |
| 2004/0055554 | A1 * | 3/2004 | Tharman et al. | 123/179.18 |
| 2009/0111651 | A1 * | 4/2009 | Gale et al. | 477/98 |
| 2009/0145491 | A1 | 6/2009 | Hlousek et al. | |

FOREIGN PATENT DOCUMENTS

| | | |
|---|---|---|
| DE | 4431189 | 3/1996 |
| DE | 19611522 | 9/1997 |
| DE | 10031852 | 1/2002 |
| DE | 10136049 | 2/2003 |
| GB | 2307513 | 5/1997 |
| WO | WO-2007/112462 | 10/2007 |

OTHER PUBLICATIONS

"International Search Report and Written Opinion of the International Searching Authority Dated Mar. 31, 2010", International Application No. PCT/US2010/021079.

* cited by examiner

*Primary Examiner* — Stephen W Jackson
*Assistant Examiner* — Angela Brooks
(74) *Attorney, Agent, or Firm* — Blakely Sokoloff Taylor & Zafman LLP

(57) ABSTRACT

A method of actuator coil temperature control for actuators that are not continuously operated, wherein when an actuation current is not being applied to the actuator coil, a) sensing a parameter indicative of the resistance of the actuator coil as an indication of the temperature of the actuator coil, b) if the sensed parameter indicates the temperature of the actuator coil is below a first predetermined limit, then initiating a series of successive actuation current pulses to the actuator coil, each actuation current pulse being terminated before actuation of the actuator occurs, and c) periodically repeating a) and b).

10 Claims, 2 Drawing Sheets

CONTROL VALVE COIL TEMPERATURE CONTROLLER

CROSS-REFERENCE TO RELATED APPLICATION

This application claims the benefit of U.S. Provisional Patent Application No. 61/144,997 filed Jan. 15, 2009 and U.S. Provisional Patent Application No. 61/225,846 filed Jul. 15, 2009.

BACKGROUND OF THE INVENTION

1. Field of the Invention

The present invention relates to valves, such as may be used in fuel injectors and other applications.

2. Prior Art

A typical application of the present invention is in spool valves, which are finding increasing use in diesel fuel injectors. See for instance U.S. Pat. No. 5,460,329, the disclosure of which is hereby incorporated by reference. Such spool valves are usually used to control the flow of engine oil to and from an intensifier and/or for direct needle control, or to engine valve actuators in a camless engine, though may also be used for other applications, such as in electro-hydraulically controlled camless engine applications.

In the case of starting an engine in cold weather, particularly a diesel engine, spool valves may become sluggish or even stick, or at least there is a fear that this will occur, complicating the starting process. Accordingly, when the engine temperature falls below a predetermined temperature, starting may be delayed by perhaps 10 or 15 seconds while the spool valves are rapidly actuated, heating the actuating coil or coils as well as providing assurance that the spool is free to move as commanded. This, however, solves only part of the problem, in that once cranking of the engine starts, cold engine oil (or fuel) being controlled by the spool valve tends to re-chill the valve to its original temperature.

There are of course many other applications wherein some of the same or similar problems are encountered, and in which the present invention may be applied.

DETAILED DESCRIPTION OF THE PREFERRED EMBODIMENTS

The present invention provides heating to spool valves (or other types of electrically controlled valves) prior to and/or during cranking for cold starts and/or after initial starting of the engine, typically until the engine warms up to a predetermined temperature. In the preferred embodiment, engine oil temperature is used as a measure of the engine or system temperature, as it is the engine oil that the spool valve will be exposed to in a preferred embodiment.

Figure 1:
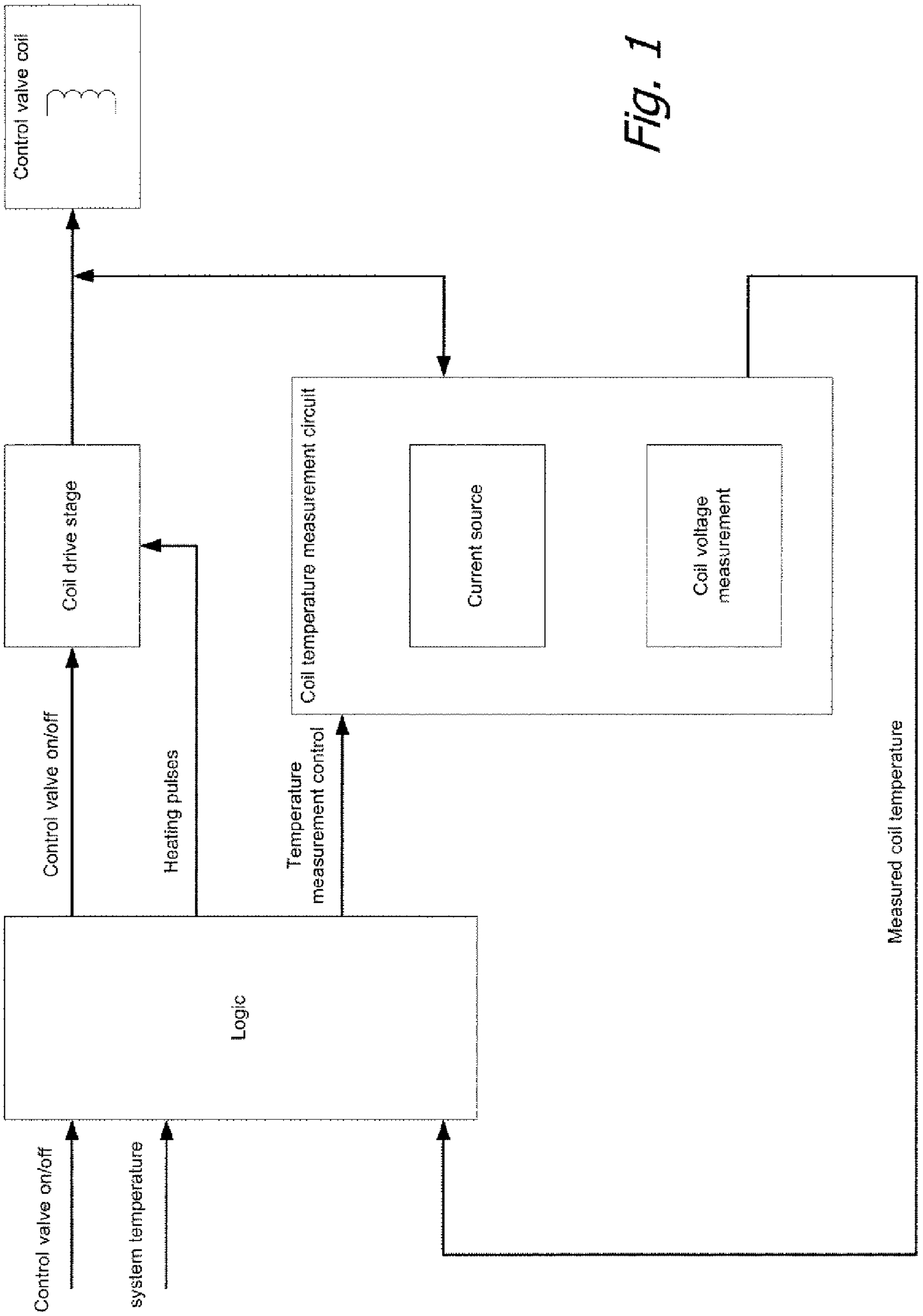
FIG. 1 is a block diagram illustrating the present invention.

First referring to FIG. 1, a block diagram of a preferred embodiment may be seen. The logic controlling the current in the control valve coil uses two primary inputs, the first being the control valve ON/OFF signal and the second being the system temperature, as stated before, preferably the engine oil temperature. The control valve ON/OFF signal is the valve actuation signal from the engine controller controlling the basic function of the valve. Exemplary valves include solenoid actuated spool valves as may be used in fuel injectors and camless engines using hydraulic engine valve actuation. When this signal is received, the logic immediately provides a control valve ON/OFF signal to the coil drive stage, which in turn provides a high current actuating drive signal to the control valve coil. The control valve ON/OFF signals override all other signals within the diagram of FIG. 1. Between control valve actuations, however, the logic monitors the coil temperature, which may be by way of example, just a simple two state signal. The logic may be a special integrated circuit or may be a processor operating under program control.

In this embodiment, when the system temperature is below a threshold temperature and cranking of the engine begins, the logic provides heating pulses to the coil drive stage. These pulses are very short pulses, each of which is terminated before the inductance of the control valve coil allows the coil current to rise to a control valve actuation current level. These pulses are repeated in quick succession for a period of time, then temporarily interrupted for the measurement of the control valve coil temperature, again as controlled by the logic. Note that termination of a heating pulse as used herein is used in the sense of termination or disconnection of the excitation causing the heating pulse. However on such termination, the current does not immediately decrease to zero, but rather decays to zero through continued conduction through the back EMF protection diode in the coil drive stage.

In particular, the logic issues a temperature measurement control signal to the coil temperature measurement circuit which connects a DC current source to the control valve coil and takes a coil voltage measurement as an indication of the control valve coil resistance, and thus the control valve coil temperature. This temperature measurement is taken periodically to assure that the control valve coil does not overheat, even though the system temperature, in this embodiment the engine oil temperature, is below the threshold temperature. If the measured coil temperature does reach a predetermined limit, the heating pulses after the measurement is taken are terminated until the measured coil temperature drops below the predetermined limit. Once the engine starts, the system temperature will gradually increase to above the threshold, at which time the logic will terminate the heating pulses and the temperature measurement control signals.

Thus the circuit of FIG. 1 will typically only be active when the system temperature is below the predetermined threshold, and then only during engine cranking and initial engine running until the system temperature rises above the threshold. Of course, this could be used before cranking begins, though actual cycling of the control valve before cranking begins is preferred because of the greater power dissipation in the control valve and the actual cycling (movement) of the valve member.

As an alternative, one could provide a DC current through the control valve coil at a level below that required for actuation of the control valve, periodically (or continually) sensing the voltage across the control valve coil to determine the system temperature and shutting off the DC current when the system temperature reached or exceeded the lower threshold. Such an embodiment would have the advantages of reduced electrical noise and perhaps could deliver greater heating capability without actuating the control valve. It would also have the advantage of always starting a control valve actuation from a repeatable starting point (starting magnetic field in the control valve magnetic circuit), rather than a somewhat random starting point. However, typical control valves used in such applications are quite fast, so that the somewhat random starting point has little effect on the control valve actuation timing.

However, such an embodiment would have the disadvantage of requiring the efficient generation of a low voltage current for each valve controlled, and the further disadvantage of concentrating all the heat generation in the control valve coil. A succession of heating pulses as described, however, will generate AC magnetic fields in the control valve body, with Eddy current losses at least somewhat directly heating other parts of the control valve.

The ability to sense coil temperature also has other advantages. By way of example, in a preferred embodiment, a solenoid operated spool valve can be actuated with a short high current pulse, followed by a relatively low holding current until the end of the valve actuation. The high current pulse assures that the spool rapidly accelerates to its actuated position. Once actuated, the spool and housing form an essentially zero air gap magnetic circuit, after which the low holding current maintains the spool at the actuated position. Since the power losses due to the coil resistance are proportional to the square of the current, and the holding current can be 20% of the actuation current or less, the heating caused by the holding current can be made relatively small, even when the holding current duration significantly exceeds the high current actuation pulse. Consequently, the ability to sense the coil temperature between valve actuations provides a method of protecting the coil from overheating during normal operation. By way of example, for a solenoid actuated spool valve used to control a fuel injector, sensing that the solenoid coil is overheating can provide a signal to the engine controller to limit the maximum speed of the engine. This reduces the frequency of the high current pulses, which are fixed in duration, thus reducing the coil heating to control its temperature. If this doesn't control the coil temperature, then in a multi-cylinder engine, the engine controller can shut down that cylinder and provide a warning signal, allowing engine operation on the remaining cylinders to provide a limp home capability without a catastrophic failure of the injector. In a camless engine, one might choose to make other engine operational changes, such as also shutting down engine intake and exhaust valve actuation for that cylinder so as to minimize air flow disturbances of the remaining cylinders. Temporarily limiting engine speed or shutting a cylinder down for a while is better and more cost effective than allowing an exceptional event to cause a permanent failure of a control valve. This capability is most useful in applications requiring high frequency actuation of a valve, such as in high speed engines and the like, where the high current actuation pulse occupies a meaningful part of the valve actuation time for each valve actuation event.

Figure 2:
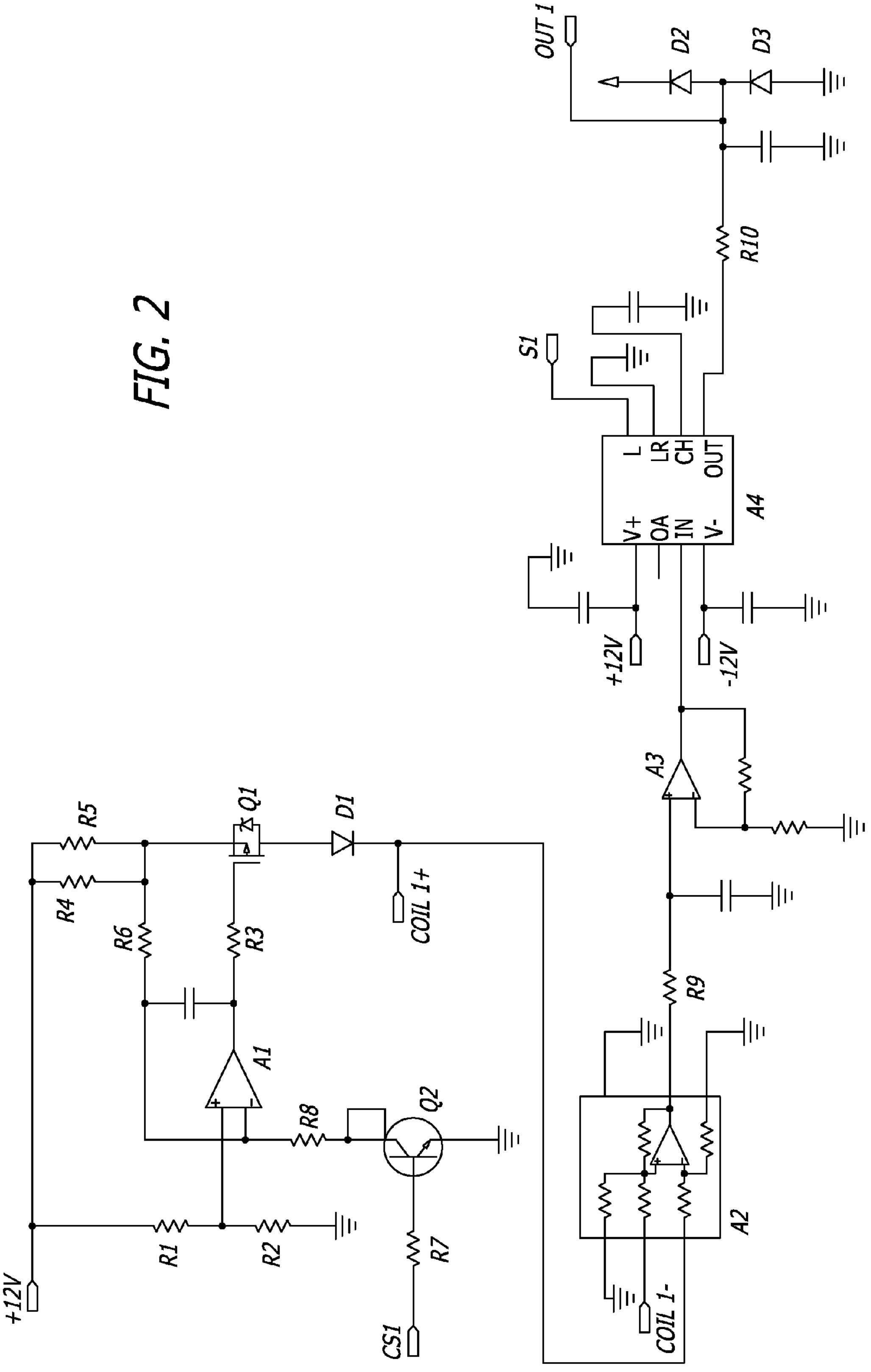
FIG. 2 is a circuit diagram of one embodiment of the coil temperature measurement circuit of FIG. 1.

Now referring to FIG. 2, a circuit diagram for the coil temperature measurement circuit shown schematically in FIG. 1 may be seen. In this circuit, the control valve coil of FIG. 1 is connected between the connections coil1+ and coil1−. The temperature measurement control inputs to the coil temperature measurement circuit shown in FIG. 1 comprise the inputs CS1 and a clock signal S1. In this circuit, resistors R1 and R2 provide an intermediate positive voltage to the positive input of amplifier A1, the output of which controls a P-type transistor Q1 through resistor R3. The negative input to amplifier A1 is biased through resistors R4, R5 and R6, with N-type transistor Q2 controlled through input CS1 applied to resistor R7 to turn on transistor Q2 to provide a pull-down voltage through resistor R8. Thus with this connection, when transistor Q2 is turned off, resistors R4, R5 and R6 pull the negative input to amplifier A1 higher than the intermediate voltage provided to the positive input of amplifier A1 by resistors R1 and R2. This holds the output of amplifier A1 low, turning on transistor Q1. On the other hand, when the signal CS1 goes high, transistor Q2 is turned on, pulling the negative input to amplifier A1 lower than the positive input through amplifier A1, thus pulling the output of amplifier A1 positive to turn off transistor Q1.

When the control valve ON/OFF signal (FIG. 1) is holding the control valve off (control valve coil not excited for control valve actuation), the signal CS1 will go low to turn off transistor Q2 and thus allow transistor Q1 to turn on. This provides a current through resistors R4 and R5, transistor Q1, diode D1 and the control valve coil. In that regard, the contact coil1− is actually a ground contact, though is grounded elsewhere in the system and thus is shown as a voltage input to amplifier A2 to allow cancellation of ground voltage differences because of high current in the control valve coil ground system, such as may be caused by high current pulses in other control valve coils using the same ground circuit, and to eliminate noise from such sources. Thus the input to amplifier A2 is a true voltage across the control valve coil connected to coil1+ and coil1−.

The output of amplifier A2 is coupled through resistor R9 and amplifier A3 to sample and hold amplifier A4. This sample and hold amplifier samples the output of amplifier A3 responsive to the clocking signal S1 to provide a periodically updated output signal OUT1 through resistor R10, with diodes D2 and D3 providing a clamp on the output OUT1 to clamp the same within the range of one diode voltage drop below the circuit ground to one diode voltage drop above a 5 volt logic supply to which diode D2 is connected. In one embodiment, a 5 volt analog to digital converter is used to convert the analog signal to a digital signal.

Thus referring back to FIG. 1, in this embodiment, when the control valve ON/OFF signal provides actuation current to the control valve coil, the heating pulses are stopped (or overridden) and the temperature measurement control signal CS1 (FIG. 2) is held high to hold transistor Q1 off (this perhaps is not essential because of diode D1 and the back EMF diode protection on the control valve coil as part of the coil drive stage) and the clocking signal S1 (FIG. 2) is stopped by the logic block of FIG. 1 (again perhaps not essential, particularly if a new temperature sensing cycle is initiated immediately after actuation current to the control valve coil is terminated). When the control valve ON/OFF signal terminates the actuation current in the control valve coil, the logic block of FIG. 1 will momentarily pull the signal CS1 (FIG. 2) low, turning off transistor Q2 and turning on transistor Q1 to provide a small current as determined primarily by resistors R4 and R5 through the control valve coil and, after a very short settling time, the sample and hold amplifier A4 will be clocked by the logic block to effectively sample the voltage across the control valve coil responsive to the clock signal S1 and provide a corresponding output voltage as the output OUT1.

The resistances of the resistors R4 and R5 are much larger than the resistance of the control valve coil and are substantially temperature insensitive. When transistor Q2 is turned off, resistors R4, R5 and R6 pull the negative input to amplifier A1 above the positive input to the amplifier, tending to turn on transistor Q1. This in turn causes a current though resistors R4 and R5, reducing the voltage on the negative input to amplifier A1. The loop stabilizes with the differential input to amplifier A1 equal to zero, at which point the voltage drop across resistors R4 and R5 is determined by the resistors R1 and R2, and is constant substantially independent of temperature. Thus the current through the control valve coil is substantially independent of the resistance of the control valve coil, which control valve coil resistance and thus the voltage drop across the control valve coil varies with temperature. Because the resistance increases with temperature, the output voltage OUT1 will similarly increase with temperature. That output voltage will be an analog voltage, though may be converted in the logic block of FIG. 1 to a 1-bit digital signal by way of a threshold detector.

If on measuring the temperature as described, the temperature is above the threshold of the threshold detector, i.e., above a predetermined limit, no heating pulses will be applied through the coil drive stage to the control valve coil until a subsequent temperature reading is taken and found to be below the predetermined limit.

The actual execution of the present invention may vary with the application thereof and vary within a particular application, as desired. By way of example, in an engine application wherein the control valve controls a fuel injector, the initiation of injection may reset the logic so that immediately on completion of the injection a coil temperature measurement may be taken as hereinbefore described, followed by a sequence of heating pulses for a predetermined length of time, after which another temperature measurement is taken, or as interrupted by initiation of the next injection event, whichever occurs first. Alternatively, the logic may be set to simply periodically measure coil temperature and to provide heating pulses between each temperature measurement if the preceding temperature measurement falls below the predetermined limit. Thus using this, control coil temperature sensing may not occur immediately after the control valve coil excitation has been terminated, but rather may occur a number of heating pulses thereafter. The frequency of the temperature sensing may be readily selected for the particular application as the time required for obtaining a coil temperature measurement may be very short and be a rather insubstantial fraction of the time between control valve coil excitation. In that regard, in some applications for high speed valve actuation, the control valve coil will be driven with high current pulses so that coil heating for each pulse can be significant. Accordingly, in many applications it may be desirable to sense coil temperature at least once between each control valve operation, and perhaps more often depending on the control of coil temperature desired.

Embodiments of the present invention have been disclosed primarily with respect to use in engines, and more specifically to use in fuel injectors for engines. However the present invention is not so limited in its use, and can be advantageously used in any application where cold starts, so to speak, or even simply cold running are sometimes encountered, and/or where temperature could become excessive because of the cumulative effects of an unusual combination of adverse operating conditions, or some failure in the coil winding or its drive system. In that regard, as coil temperature goes up, the coil resistance increases, so an upper coil temperature limit is a limit on coil resistance. There will also be a lower resistance limit that can be set, below which there must be a coil fault, such as shorted turns in the coil or a current leak to ground, in which case a failure may be indicated and system operating conditions changed or the system shut down, as appropriate. This can be achieved, by way of example, by use of a second threshold detector in the logic block of FIG. 1.

Thus while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of actuator coil temperature control when heating actuators by the actuator coil for actuators that are not continuously operated comprising:

when an actuation voltage is not being applied to the actuator coil;

a) sensing the resistance of the actuator coil as an indication of the temperature of the actuator coil;

b) if the temperature of the actuator coil is below a first predetermined limit, then initiating a series of successive actuation voltage pulses to the actuator coil to heat the actuator, each actuation voltage pulse being terminated before actuation of the actuator occurs;

c) periodically repeating a) and b).

2. The method of claim 1 wherein in the series of successive actuation voltage pulses to the actuator coil, each actuation voltage pulse is terminated for a sufficient length of time for a current in the actuator coil to decay to zero before the next actuation voltage pulse is initiated.

3. The method of claim 1 wherein a), b) and c) are terminated during actuation of the actuator.

4. The method of claim 1 wherein a) is initiated before b) after intentional actuation of the actuator is terminated.

5. The method of claim 1 further comprising in b):

if the resistance of the actuator coil is below a first predetermined limit and is also below a lower second predetermined limit, then not initiating the series of successive actuation current pulses to the actuator coil and indicating a failure.

6. A method of actuator coil temperature control for actuators that are not continuously operated comprising:

when an actuation current is not being applied to the actuator coil;

a) sensing a parameter indicative of the resistance of the actuator coil as an indication of the temperature of the actuator coil;

b) if the sensed parameter indicates the temperature of the actuator coil is below a first predetermined limit, then initiating a series of successive actuation voltage pulses to the actuator coil to heat the actuator, each actuation voltage pulse being terminated before actuation of the actuator occurs;

c) periodically repeating a) and b).

7. The method of claim 6 wherein in the series of successive actuation voltage pulses to the actuator coil, each actuation voltage pulse is terminated for a sufficient length of time for a current in the actuator coil to decay to zero before the next actuation voltage pulse is initiated.

8. The method of claim 6 wherein a), b) and c) are terminated during actuation of the actuator.

9. The method of claim 6 wherein a) is initiated before b) after actuation of the actuator is terminated.

10. The method of claim 6 further comprising in b):

if the resistance of the actuator coil is below a first predetermined limit and is also below a lower second predetermined limit, then not initiating the series of successive actuation voltage pulses to the actuator coil.

* * * * *